(No Model.)
G. O. DRAPER.
TRANSVERSE SEAT FOR FOOT POWER VEHICLES.
No. 524,106. Patented Aug. 7, 1894.
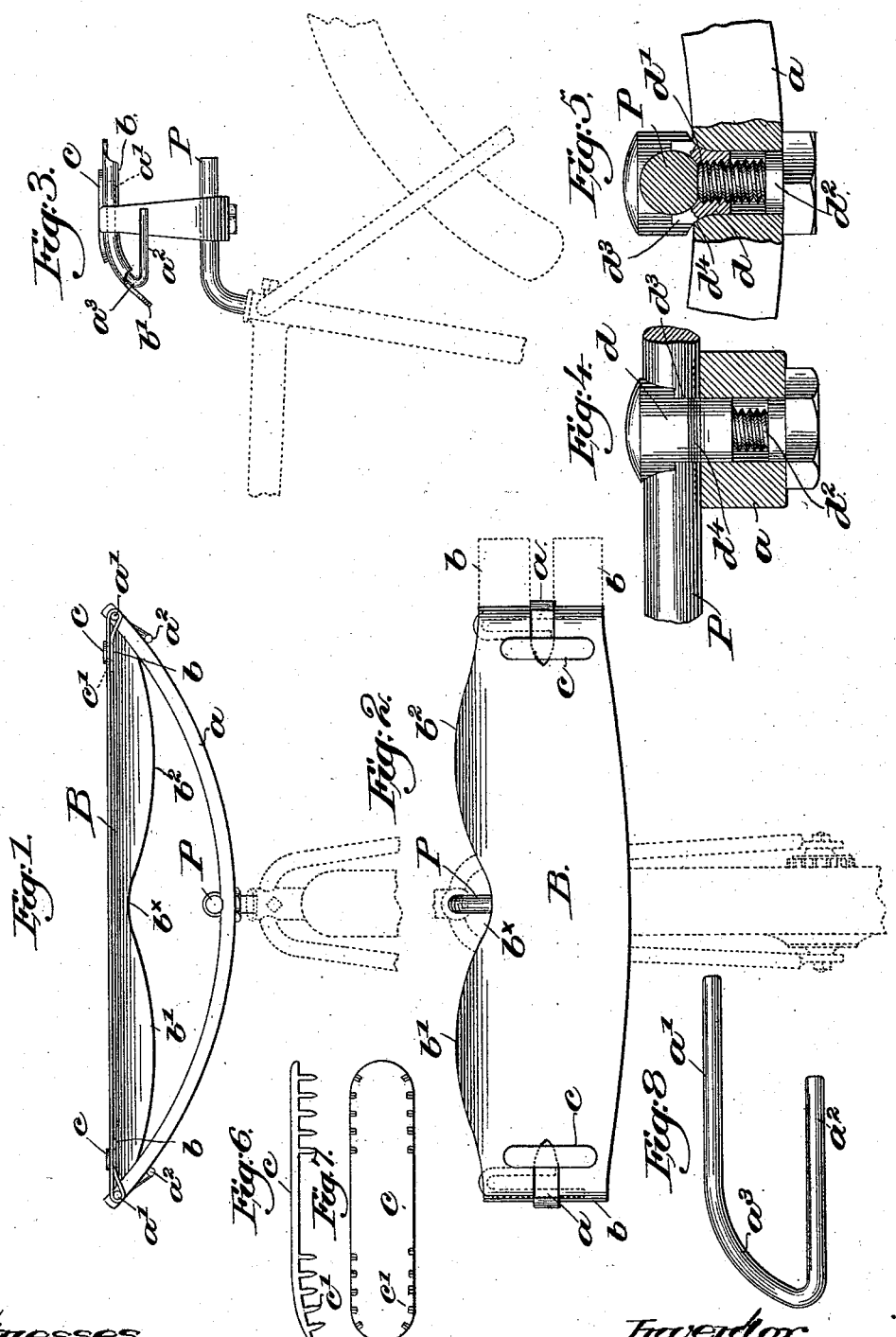
Witnesses.
Fred S. Greenleaf.
Thomas J. Drummond
Inventor:
George O. Draper
by Crosby & Gregory attys.

UNITED STATES PATENT OFFICE.

GEORGE O. DRAPER, OF HOPEDALE, MASSACHUSETTS.

TRANSVERSE SEAT FOR FOOT-POWER VEHICLES.

SPECIFICATION forming part of Letters Patent No. 524,106, dated August 7, 1894.

Application filed April 2, 1894. Serial No. 506,000. (No model.)

*To all whom it may concern:*

Be it known that I, GEORGE O. DRAPER, of Hopedale, county of Worcester, State of Massachusetts, have invented an Improvement in Transverse Seats for Foot-Power Vehicles, of which the following description, in connection with the accompanying drawings, is a specification, like letters on the drawings representing like parts.

In bicycles or other foot power vehicles the seat or saddle is a most important element, as it must not only sustain the weight of the rider, but it must also permit free movement of the legs. The saddle now universally used is a leather suspension seat hung from front and rear supports on a frame, usually resilient, the rider straddling the suspended seat portion and working the legs on each side of it. Such saddles are injurious to the system, and the evils resulting by their use in numerous instances have attracted the attention of eminent medical practitioners, while many men and women have been compelled to forego an otherwise valuable exercise and great convenience. Attempts have been made to remedy the injurious effects due to such saddles by using cushioned seats which are not straddled, and in some instances transverse suspension seats have been tried, but owing to objectionable features such seats have never been successfully used, so far as I am aware.

This invention has for its object the production of a suspension seat for foot power vehicles which is not straddled by the rider, while it permits freedom of leg movement. Various details of construction are incorporated therein some of which may be applied with equal value to other types of seats, and my invention is not, therefore, restricted in all its details to any one particular type of saddle or seat.

In accordance therewith my invention consists, primarily, of a flexible transverse seat for foot power vehicles, and novel means whereby it is made to adapt itself to and to permit the fullest freedom of leg movement, substantially as will be described.

Other features of my invention will be hereinafter described and particularly pointed out in the claims.

Figure 1 is a rear end elevation of a seat embodying my invention, a portion of the frame of the bicycle being shown in dotted lines. Fig. 2 is a top or plan view, and Fig. 3, a side view, thereof, a part of the frame in each case being shown in dotted lines. Figs. 4 and 5 are enlarged detail views, partly in section, of the clamp mechanism, to be described. Figs. 6 and 7 are enlarged details of the seat retaining devices, and Fig. 8 is a detached view on a larger scale of one of the seat supports.

To the usual seat post P, I clamp a bent wooden frame $a$, extending across or transverse to the longitudinal axis of the vehicle. By making the frame $a$ of some light, tough wood, I greatly decrease the weight, and by bending the frame I obtain a very valuable elasticity which serves to keep the seat at proper tension.

At each end of the frame $a$ I have secured seat supports, herein shown as pieces of stout wire bent to form legs $a'$, $a^2$, see Fig. 8, connected by a bent portion $a^3$, and one leg of each is extended through a suitable hole in each end of the frame $a$, the other leg resting upon the outer face of the frame, the bend $a^3$ extending in front and downwardly, as shown in Figs. 1 and 3, to incline the front edge of the seat, as shown best in Figs. 1 and 3.

The seat portion B, of leather or other suitable flexible material, is secured at its ends to the said supports and tightly stretched and suspended between them, transverse to the direction of movement of the vehicle, the rider being supported thereby as in a chair, without any strain upon the person other than at the under side of the legs.

In order that the rider may move each leg independently and easily, and without any chafing, I form the front edge of the seat B with two independent flaps or projecting portions $b'$, $b^2$, separated by a cut away or notched portion $b^x$ on or back of a line joining the front corners of the seat, whereby the conformation of the seat to the body of the rider is increased. Owing to the flexible nature of the material forming the seat these flaps will yield to the pressure of the legs and prevent chafing, which would inevitably occur if such movement of the legs were made over a straight edge. The downwardly inclined bent portions $a^3$ of the supports, at the front of the seat, assist still further in obviating chafing, and also tend to shape the seat more in accordance with the easy movement of the body.

In order to prevent the seat B from sagging at the center and thereby causing pressure or binding on the sides of the rider's legs, it must be tightly stretched, and so maintained continuously. This I accomplish by the elastic frame $a$, which is bent up when applying the seat, so that the extremities are brought together closer than they would be normally, as when a bow is bent to string it, the seat holding the frame from returning to its normal tension. Such tension of the frame takes up any slack in the seat, maintaining it taut and effectually prevents sagging, the ends of the frame $a$ always tending to separate and resume their normal position of greatest separation.

I provide for additional adjustment of the seat B, when the material thereof has stretched, by the use of adjustable clips $c$, shown separately in Figs. 6 and 7. The clips $c$ are shown as metallic plates provided at one side with teeth $c'$ long enough to penetrate two thicknesses of the leather or other material, the said clamps being very similar to belt fasteners, but with longer teeth, which are not upset or clinched when forced through the material.

The seat B is slitted at each end to leave two tongues $b$, see dotted lines Fig. 2, which are turned under upon the material of the seat, to form loops through which the legs $a'$ of the supports are extended, the ends of the frame $a$ coming between the loops at each end of and holding the seat in place.

The teeth $c'$ of the clips $c$ are forced through the seat from its upper side and into the turned under tongues $b$, firmly holding them in place, and when it is desired to tighten the seat the clips are lifted sufficiently to withdraw the teeth from the tongues, which are still further turned under until the desired tension is attained, whereupon the teeth of the clips are reinserted, but in a new place, the front end of the clips being slightly bent, as shown, to conform to the seat.

I have herein shown the frame $a$ as connected to the saddle post P by a simple and novel two-part clamp, consisting, as best shown in Figs. 4 and 5, of an open headed shank $d$ to receive the post P, the shank having a threaded intersecting hole $d'$, into which a clamping nut $d^2$ is screwed, its head bearing on the frame $a$ when the clamp is in position thereon. The head of the shank is squared on two sides, as at $d^3$, and concaved, as at $d^4$, on the other two. A hole $a^\times$ is made in the center of the frame $a$ and the headed shank is placed therein from the upper side, rotation of the nut $d^2$ in the proper direction in its threaded hole $d'$ drawing the shank toward it, the pressure drawing the headed portion of the shank and the seat post P into the wood of the frame, and acting in conjunction with the squared portions $d^3$ to effectually lock the frame from side motion. The frame is thus practically suspended from the saddle post P of the vehicle, and I prefer such construction as it permits greater curvature of the frame $a$ without bringing the seat portion B too high above the vehicle frame and suspending the seat frame as shown and described enables the seat to more readily adapt itself to the person, and the liability of injurious strain in use is greatly reduced.

Inasmuch as the wooden frame, seat clips and post clamp may be readily adapted to ordinary fore and aft seats I do not restrict that portion of my invention solely to transverse seats.

I claim—

1. A flexible transverse seat for foot power vehicles, having an irregular front edge shaped to provide projecting portions or flaps to bear against the under sides of the legs of the rider, substantially as described.

2. A flexible transverse seat for foot power vehicles, having its front edge shaped to present a central notched or recessed portion, and a flap or projection at each side thereof, substantially as described.

3. A flexible transverse seat for foot power vehicles, and side supports therefor, the front edge of the seat being recessed or cut away rearwardly at its central portion to or beyond a line connecting the front corners of the seat, substantially as described.

4. In a saddle, a curved transverse frame, side supports secured transversely thereto at its ends, and a flexible seat shaped to present portions of greater width than the length of the said side supports and stretched solely between the same, to operate, substantially as described.

5. A suspension seat of flexible material, end supports therefor around which the material is bent to form loops, and a clip having teeth to enter the main and bent over loop portion of the seat to hold them securely together, substantially as described.

In testimony whereof I have signed my name to this specification in the presence of two subscribing witnesses.

GEORGE O. DRAPER.

Witnesses:
GEO. W. GREGORY,
JOHN C. EDWARDS.